United States Patent
Sakai et al.

(10) Patent No.: US 11,679,742 B2
(45) Date of Patent: Jun. 20, 2023

(54) VEHICULAR SYSTEM

(71) Applicant: Koito Manufacturing Co., Ltd., Tokyo (JP)

(72) Inventors: Masaru Sakai, Shizuoka (JP); Masaaki Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 156 days.

(21) Appl. No.: 16/296,441

(22) Filed: Mar. 8, 2019

(65) Prior Publication Data

US 2019/0283716 A1   Sep. 19, 2019

(30) Foreign Application Priority Data

Mar. 15, 2018  (JP) .............................. JP2018-047868

(51) Int. Cl.
*B60S 1/66* (2006.01)

(52) U.S. Cl.
CPC ....................................... *B60S 1/66* (2013.01)

(58) Field of Classification Search
CPC ...... B60S 1/66; B60S 1/56–685; G01S 17/86; G01S 17/931; B60R 11/04; B60R 1/00; G02B 27/0006
See application file for complete search history.

(56) References Cited

U.S. PATENT DOCUMENTS

| | | | |
|---|---|---|---|
| 2012/0117745 A1 | 5/2012 | Hattori et al. | |
| 2015/0353024 A1* | 12/2015 | Cooper | B60S 1/0848 348/148 |
| 2016/0272163 A1* | 9/2016 | Dreiocker | H04N 5/2257 |
| 2017/0115480 A1* | 4/2017 | Wada | G03B 15/02 |
| 2018/0186341 A1* | 7/2018 | Kimura | B60S 1/56 |
| 2019/0126825 A1* | 5/2019 | Park | G06T 3/4038 |
| 2019/0184910 A1* | 6/2019 | Bazille | H04N 21/4223 |

FOREIGN PATENT DOCUMENTS

| | | | | |
|---|---|---|---|---|
| JP | H11-142514 A | | 5/1999 | |
| JP | H11142514 A | * | 5/1999 | |
| JP | 4692692 B | | 3/2011 | |
| JP | 2015-105070 A | | 6/2015 | |
| JP | 2015-148533 A | | 8/2015 | |
| JP | 2016-187990 A | | 11/2016 | |
| WO | WO-2017002877 A1 | * | 1/2017 | ............. H04N 5/225 |

OTHER PUBLICATIONS

Machine Translation of JPH11142514A (Year: 1999).*

(Continued)

*Primary Examiner* — Spencer E. Bell
(74) *Attorney, Agent, or Firm* — Venjuris, P.C.

(57) ABSTRACT

A vehicular system includes a first in-vehicle sensor having a first cleaning target surface which is provided on a design part forming an appearance of a vehicle and arranged so as to face an exterior of the vehicle. The first cleaning target surface is arranged at an inner side of the vehicle than an immediate upper portion of the first cleaning target surface. The immediate upper portion is constituted by a protrusion provided in a rear bumper.

15 Claims, 7 Drawing Sheets

(56) References Cited

OTHER PUBLICATIONS

The Written Opinion for a French counterpart (FR1902623) of this application, dated Sep. 28, 2020 and English translation thereof (7 pages).
An Office Action dated Jan. 20, 2022, issued from the Japanese Patent Office (JPO) of Japanese Patent Application No. 2018-047868 and a Machine translation thereof (6 pages).
An Office Action dated Apr. 29, 2022, issued from the China National Intellectual Property Administration (CNIPA) of Chinese Patent Application No. 201910179417.1 and a EN translation thereof (14 pages).

* cited by examiner

VEHICULAR SYSTEM

CROSS-REFERENCE TO RELATED APPLICATIONS

This application is based on and claims priority from Japanese Patent Application No. 2018-047868, filed on Mar. 15, 2018, with the Japan Patent Office, the disclosure of which is incorporated herein in its entirety by reference.

TECHNICAL FIELD

The present disclosure relates to a vehicular system.

BACKGROUND

A head lamp cleaner for a vehicle is disclosed in, for example, Japanese Patent Laid-open Publication No. 2016-187990.

SUMMARY

In recent years, attempts have been made to develop vehicles that may be automatically operated. In implementing an automatic operation, it is required to maintain, for example, the good sensitivity of a LiDAR. Therefore, a sensor cleaner which cleans the LiDAR is required.

The present disclosure provides a vehicular system that is capable of preventing adhesion of dirt to a cleaning target surface of an in-vehicle sensor.

In order to achieve the above-described objective, the vehicular system of the present disclosure is a vehicular system including a first in-vehicle sensor having a first cleaning target surface which is provided on a design part forming an appearance of a vehicle and arranged so as to face an exterior of the vehicle. The first cleaning target surface is arranged at an inner side of the vehicle with respect to an immediate upper portion of the first cleaning target surface.

According to the present disclosure, it is possible to provide a vehicular system that is capable of preventing adhesion of dirt to the first cleaning target surface of the first in-vehicle sensor.

Further, in the vehicular system of the present disclosure, the immediate upper portion may be constituted by a protrusion provided on the design part or the first in-vehicle sensor.

According to the present disclosure, it is possible to easily prevent adhesion of dirt to the first cleaning target surface of the first in-vehicle sensor.

Further, in the vehicular system of the present disclosure, the protrusion may be detachably provided with respect to the design part or the first in-vehicle sensor.

The degree of adhesion of dirt to the first cleaning target surface varies depending on the mounting position of the in-vehicle sensor on the vehicle. For example, an in-vehicle sensor mounted on the underside of the vehicle is susceptible to contamination due to rolling up of muddy water during traveling. According to the above-described configuration, since the protrusion may be provided as necessary according to the mounting position of the in-vehicle sensor, the design property of the vehicle may not be greatly impaired.

In addition, the vehicular system of the present disclosure further includes: a first cleaner having a nozzle that sprays a cleaning medium on the first cleaning target surface, and the immediate upper portion may be constituted by a protrusion provided on the design part or the first in-vehicle sensor.

According to this configuration, it is possible to prevent adhesion of dirt to the first in-vehicle sensor by the protrusion provided on the first cleaner that cleans the first in-vehicle sensor, while it is possible to clean the first in-vehicle sensor by the first cleaner when dirt adheres.

Further, in the vehicular system of the present disclosure, the protrusion may be formed to extend along an upper edge of the first cleaning target surface and have a width in a left-and-right direction which is larger than a width in a left-and-right direction of the first cleaning target surface.

According to this configuration, it is possible to easily prevent adhesion of dirt to the first cleaning target surface.

Further, in the vehicular system of the present disclosure, the protrusion may be formed to extend along both side surfaces of the first cleaning target surface.

According to this configuration, it is possible to easily prevent adhesion of dirt to the first cleaning target surface.

In addition, the vehicular system of the present disclosure may further include: a second in-vehicle sensor provided on the upper portion of the first in-vehicle sensor of the design part and having a second cleaning target surface to be arranged so as to face the exterior of the vehicle; and a second cleaner having a nozzle that sprays a cleaning medium on the second cleaning target surface.

Even when the cleaning medium sprayed from the second cleaner flows toward the first in-vehicle sensor provided under the second in-vehicle sensor, since the first in-vehicle sensor is arranged at the inner side of the vehicle than the immediate upper portion, it is possible to prevent the first in-vehicle sensor from being contaminated by the cleaning medium sprayed from the second cleaner.

According to the present disclosure, it is possible to provide a vehicular system that is capable of preventing adhesion of dirt to the first cleaning target surface of the first in-vehicle sensor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

An example of a vehicular system according to the embodiment of the present disclosure will be described with reference to the accompanying drawings. In this example, the expressions "left-and-right direction," "front-and-rear direction," and "upward-and-downward direction" refer to the relative directions set for a vehicle V illustrated in FIG. 1 for convenience of explanation.

Figure 1:
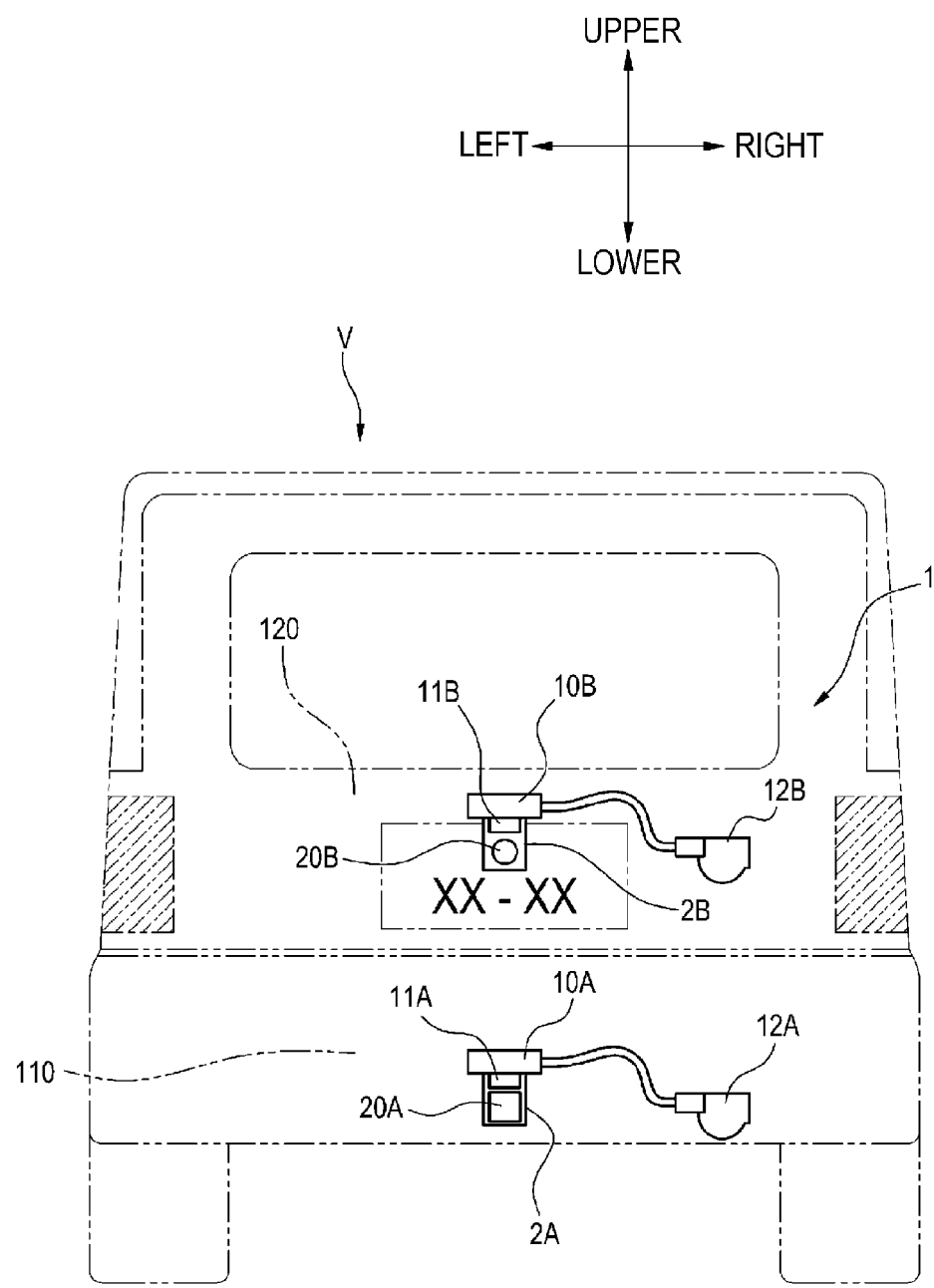
FIG. 1 is a rear view of a vehicle including a vehicular system according to an embodiment of the present disclosure.
Figure 2:
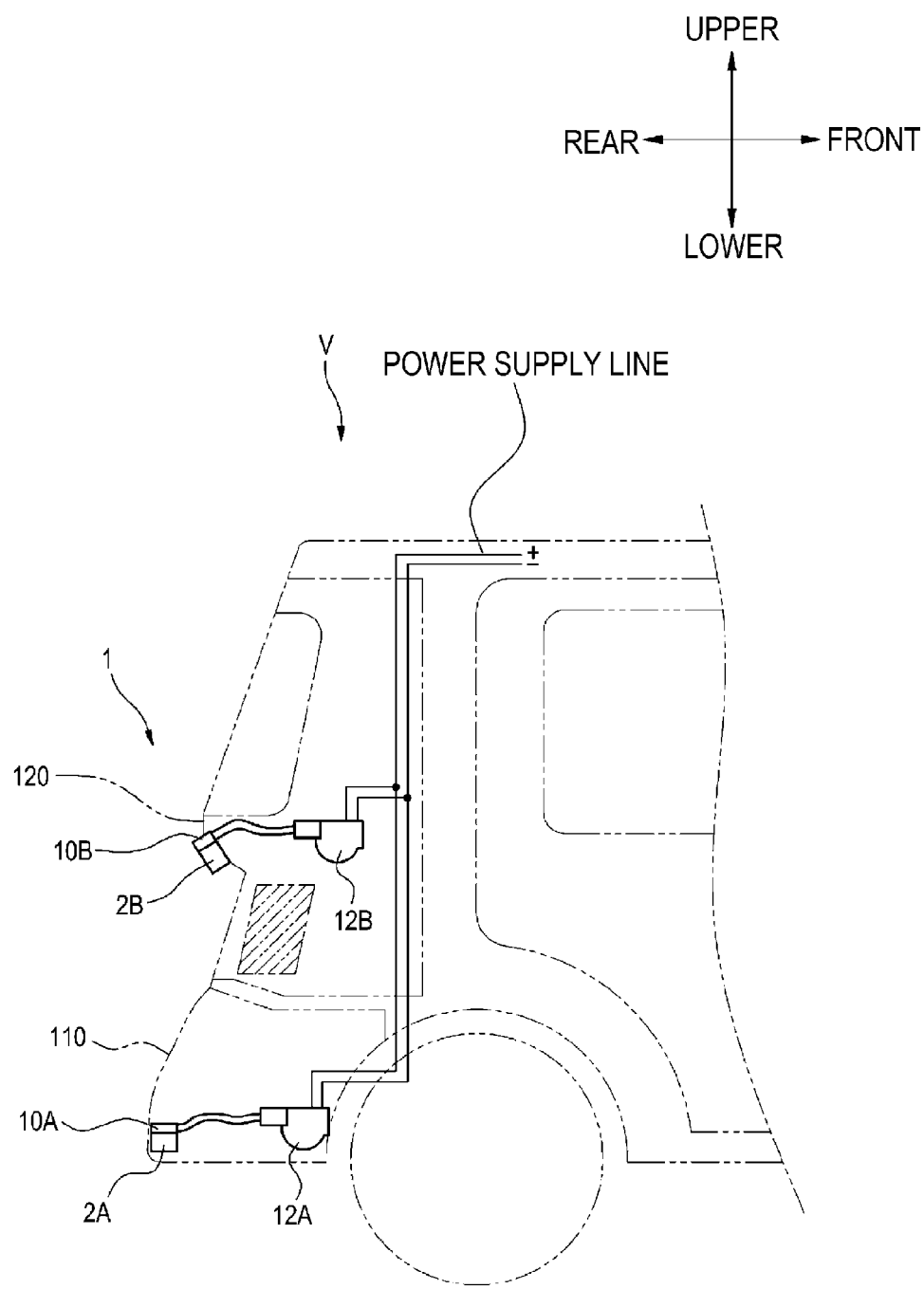
FIG. 2 is a side view of a rear portion of the vehicle illustrated in FIG. 1.

FIG. 1 is a rear view of the vehicle V on which a vehicular system 1 of the present embodiment is mounted. Further, FIG. 2 is a side view in which the rear portion of the vehicle V illustrated in FIG. 1 is observed from the right side. The vehicle V is a vehicle capable of traveling in an automatic operation mode in which the traveling control of the vehicle is automatically performed. The vehicular system 1 is a system necessary for the vehicle V to perform the automatic operation mode.

As illustrated in FIGS. 1 and 2, the vehicular system 1 includes in-vehicle sensors 2 (2A, 2B) provided in a design part that forms the appearance of the vehicle V. The in-vehicle sensor 2 is a sensor capable of acquiring external information of the own vehicle, and is made up of at least one of, for example, a LiDAR, a camera, and a radar. The in-vehicle sensor 2A of this example is a LiDAR (an example of a first in-vehicle sensor) and the in-vehicle sensor 2B is a camera (an example of a second in-vehicle sensor).

The camera 2B is arranged above the LiDAR 2A. In this example, the LiDAR 2A is provided in, for example, a rear bumper 110 which is a design part of the vehicle V. Further, the camera 2B is provided in, for example, a vehicle body panel 120 of a back door which is a design part of the vehicle V. The LiDAR 2A has a light receiving/emitting surface 20A (an example of a first cleaning target surface). In addition, the camera 2B has a lens 20B (an example of a second cleaning target surface). The LiDAR 2A and the camera 2B are provided in a state in which the light receiving/emitting surface 20A and the lens 20B are exposed toward the rear of the vehicle V to the exterior of the vehicle.

The LiDAR 2A acquires external information including the surrounding environments of the vehicle V (e.g., other vehicle, pedestrians, road shapes, traffic signs, and obstacles). The term "LiDAR" is an abbreviation for "Light Detection and Ranging" or "Laser Imaging Detection and Ranging." In general, the LiDAR is a sensor that emits invisible light in front of a light incident/emitting face (light receiving/emitting surface), and acquires information such as, for example, the distance to an object, the shape of the object, the material of the object, and the color of the object based on the outgoing light and the return light.

The camera 2B is a camera that photographs an image in the vicinity of the rear of the vehicle V, and operates, for example, when the gear of the vehicle V is switched to reverse. The camera 2B includes image pickup elements such as, for example, a charge-coupled device (CCD) and a complementary MOS (CMOS). The camera 2B is a camera that detects visible light or an infrared camera that detects infrared rays.

Further, when a radar is used as an in-vehicle sensor, for example, a millimeter wave radar, a microwave radar, or a laser radar is available.

In addition, the LiDAR 2A and the camera 2B are not limited to those provided in the rear portion of the vehicle V and may be provided in, for example, the front portion or the side portion of the vehicle V.

Further, the vehicular system 1 may include a LiDAR cleaner 10A that cleans the LiDAR 2A (an example of a first cleaner) and a camera cleaner 10B that cleans the camera 2B (an example of a second cleaner). The LiDAR cleaner 10A includes a nozzle 11A capable of spraying a cleaning medium toward the light receiving/emitting surface 20A of the LiDAR 2A. The LiDAR cleaner 10A includes a drive unit 12A, and a power supply terminal of the drive unit 12A is connected to a power supply line of the vehicle V. The camera cleaner 10B includes a nozzle 11B capable of spraying a cleaning medium toward the lens 20B of the camera 2B. The camera cleaner 10B includes a drive unit 12B, and a power supply terminal of the drive unit 12B is connected to a power supply line of the vehicle V. The LiDAR cleaner 10A and the camera cleaner 10B have the same configuration.

Figure 3:
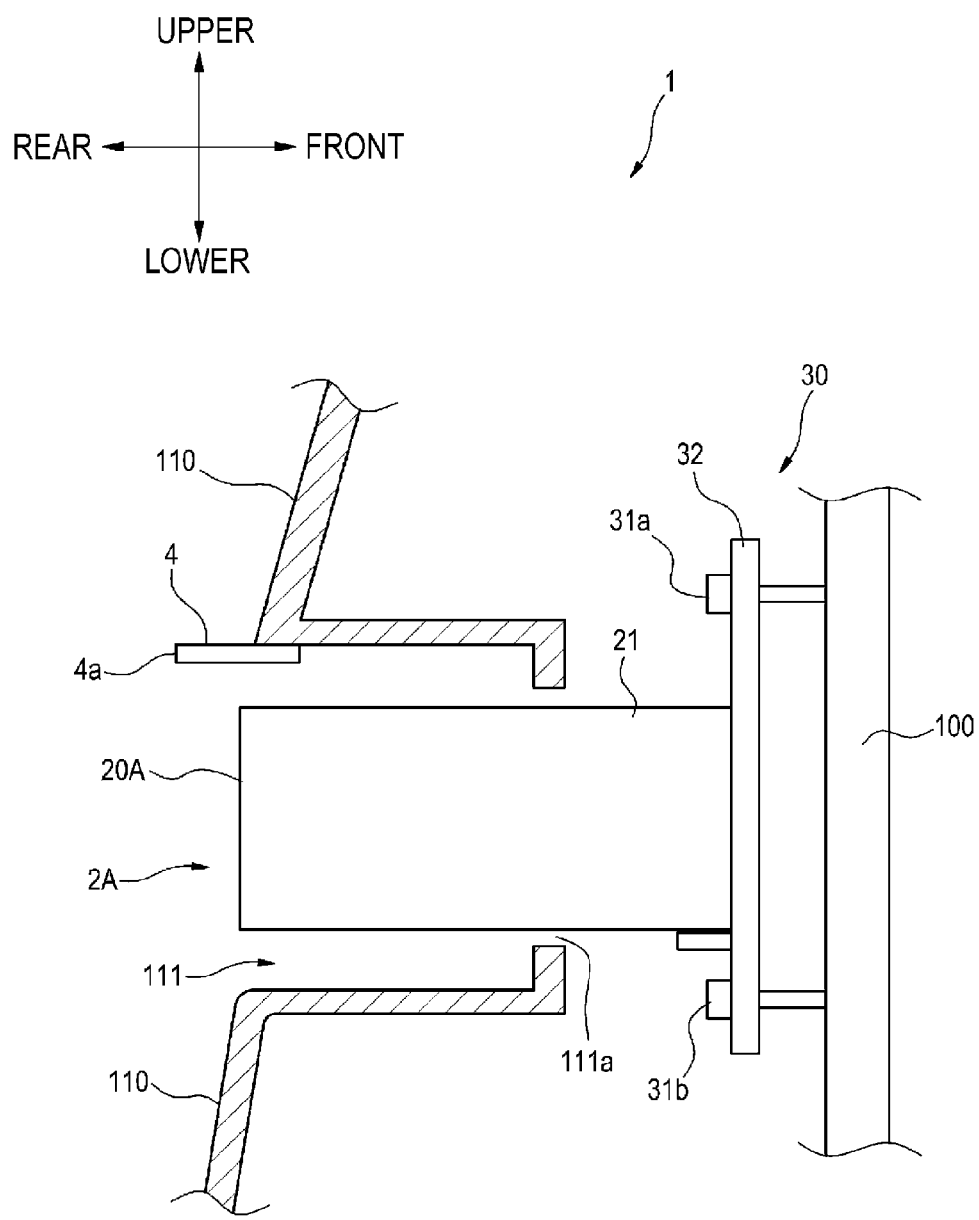
FIG. 3 is a cross-sectional view of the vehicular system according to the embodiment of the present disclosure.

FIG. 3 is a cross-sectional view of the vehicular system 1. As illustrated in FIG. 3, the LiDAR 2A of the vehicular system 1 is provided in a recess 111 formed in a rear bumper 110. The LiDAR 2A is provided in a vehicle body (frame) 100 of the vehicle V via an aiming mechanism 30. The aiming mechanism 30 is a mechanism capable of adjusting the mounting angle of the LiDAR 2A with respect to the vehicle V, and includes two screws 31a and 31b for angle adjustment, and an aiming plate 32 provided in these two screws 31a and 31b. Further, in the example illustrated in FIG. 3, the illustration of the LiDAR cleaner 10A that cleans the LiDAR 2A is omitted.

In the LiDAR 2A, a casing portion 21 of the LiDAR 2A is fixed to the aiming plate 32. The LiDAR 2A fixed to the aiming plate 32 is arranged such that a part of the LiDAR 2A is inserted into an insertion hole 111a formed in the recess 111 and a part of the inserted LiDAR 2A is located inside the recess 111. A light receiving/emitting surface 20A arranged so as to face the exterior of the vehicle (in this example, the rear exterior of the vehicle V) is provided at the distal end portion of the LiDAR 2A arranged in the recess 111.

The LiDAR 2A is provided with a protrusion 4 that prevents adhesion of dirt to the light receiving/emitting surface 20A of the LiDAR 2A. The protrusion 4 is provided on the rear bumper 110 arranged at the upper side of the LiDAR 2A. The protrusion 4 is provided so as to extend toward the rear of the vehicle V. The protrusion 4 is provided at the entrance of the recess 111 formed in the rear bumper 110 (in the rearward direction of the vehicle V). Further, the protrusion 4 is provided at a position above the LiDAR 2A at the entrance of the recess 111. In this example, the protrusion 4 provided in the rear bumper 110 is a member of the immediate upper portion of the light receiving/emitting surface 20A of the LiDAR 2A. The protrusion 4 is detachably provided to the rear bumper 110.

The light receiving/emitting surface 20A of the LiDAR 2A is arranged at the inner side of the vehicle than a rear end 4a of the protrusion 4 of the immediate upper portion (forward direction with respect to the vehicle V).

Figure 4:
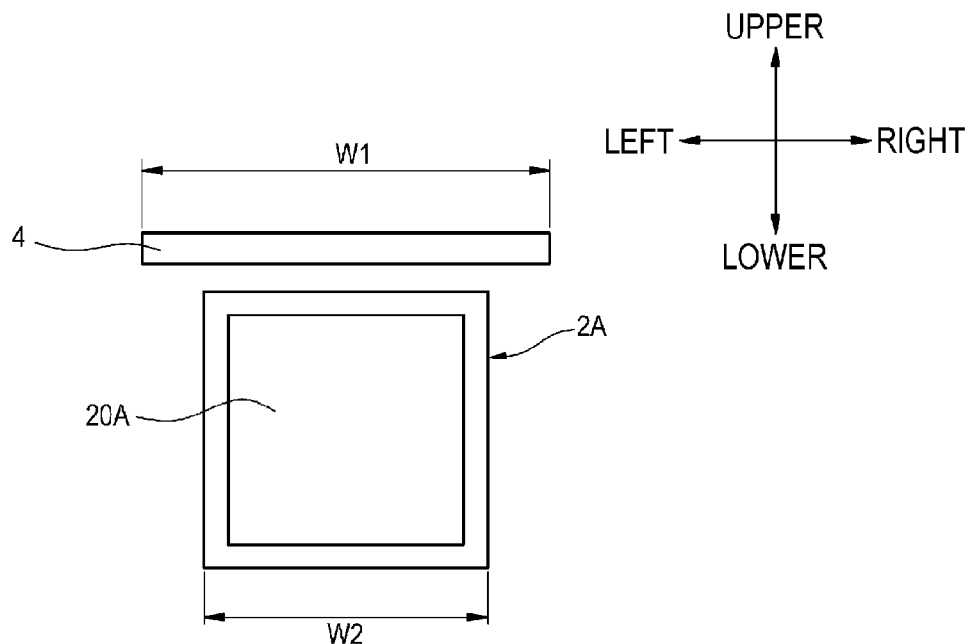
FIG. 4 is a view illustrating an example of a protrusion provided on a design part.

FIG. 4 is a view illustrating an example of the protrusion 4 provided in the rear bumper 110, in which the LiDAR 2A and the protrusion 4 are observed from the rear of the vehicle V.

As illustrated in FIG. 4, the protrusion 4 is provided so as to extend at least along the upper edge of the light receiving/emitting surface 20A of the LiDAR 2A. A width W1 of the protrusion 4 in the left-and-right direction is formed so as to be larger than a width W2 in the left-and-right direction of the light receiving/emitting surface 20A. The protrusion 4 is formed of, for example, a flat plate-like member. As illustrated in FIG. 3, the rear end 4a of the protrusion 4 protrudes rearward than the light receiving/emitting surface 20A of the LiDAR 2A.

According to the vehicular system 1 having the above-described configuration, the protrusion 4 provided in the rear bumper 110 is a member provided right above the light receiving/emitting surface 20A of the LiDAR 2A, and the protrusion 4 thereof is provided to be arranged at the outer side of the vehicle than the light receiving/emitting surface 20A (rearward direction with respect to the vehicle V). Therefore, it is possible to prevent foreign matters such as water droplets, mud, and dust flowing in the direction of the light receiving/emitting surface 20A, by the protrusion 4, and it is possible to suppress adhesion of dirt to the light receiving/emitting surface 20A.

In particular, when a cleaning liquid (an example of a cleaning medium) is sprayed from the camera cleaner 10B to clean the camera 2B provided above the LiDAR 2A, the cleaning liquid containing the dirt removed from the camera 2B and the dirt adhering to the vehicle body panel flows downward. Therefore, the LiDAR 2A may be contaminated by the cleaning liquid. However, according to the vehicular system 1 having the above-described configuration, since the protrusion 4 provided in the rear bumper 110 may prevent the cleaning liquid that has been sprayed from the camera cleaner 10B and flowed downward, even when the cleaning liquid is sprayed from the camera cleaner 10B, it is possible to suppress adhesion of dirt to the light receiving/emitting surface 20A of the LiDAR 2A.

The degree of adhesion of dirt to the light receiving/emitting surface 20A changes according to the position of the LiDAR 2A provided in the vehicle V. For example, in the case of the LiDAR mounted on the lower portion of the vehicle V, dirt tends to adhere to the light receiving/emitting surface 20A due to rolling up of muddy water while traveling. In the meantime, when the LiDAR is mounted on the upper portion of the vehicle V, less muddy water is rolled up than in the lower portion. Therefore, it is possible to mount the protrusion 4 as necessary according to the mounting position of the LiDAR 2A by providing the protrusion 4 in a detachable manner, so that the design property of the vehicle V is not greatly impaired.

Further, since the protrusion 4 is formed to be larger than the width in the left-and-right direction of the light receiving/emitting surface 20A, it is possible to suppress adhesion of dirt to the light receiving/emitting surface 20A.

In addition, since the protrusion 4 is provided right above the light receiving/emitting surface 20A of the LiDAR 2A, even when the cleaning medium is sprayed from the camera cleaner 10B to clean the camera 2B disposed on the upper portion of the LiDAR 2A and flows downward, it is possible to prevent the cleaning medium from adhering to the light receiving/emitting surface 20A by the protrusion 4.

Figure 5:
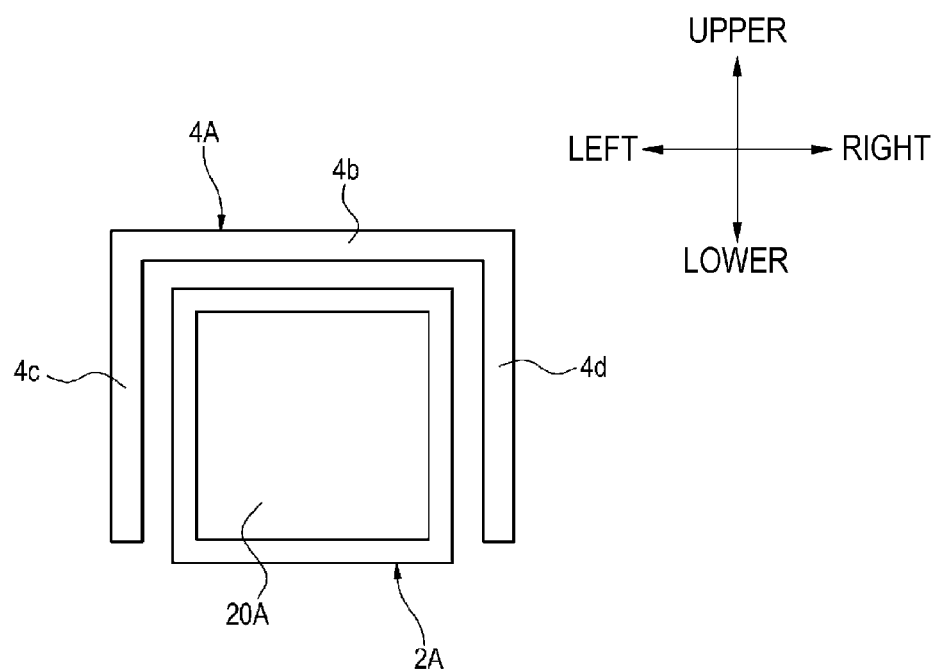
FIG. 5 is a view illustrating a modification of the protrusion illustrated in FIG. 4.

FIG. 5 is a view illustrating a protrusion provided in the rear bumper 110 according to a first modification.

As illustrated in FIG. 5, a protrusion 4A of the first modification is formed so as to have protruding portions 4c and 4d which extend from both end portions of the protruding portion 4b extending along the upper edge of the light receiving/emitting surface 20A and further along both side surfaces of the light receiving/emitting surface 20A. The rear end 4a of the protruding portions 4b to 4d protrudes rearward than the light receiving/emitting surface 20A of the LiDAR 2A. According to this configuration, since the protrusion 4A is also formed along both side surfaces of the light receiving/emitting surface 20A, it is possible to further suppress adhesion of dirt to the light receiving/emitting surface 20A.

Figure 6:
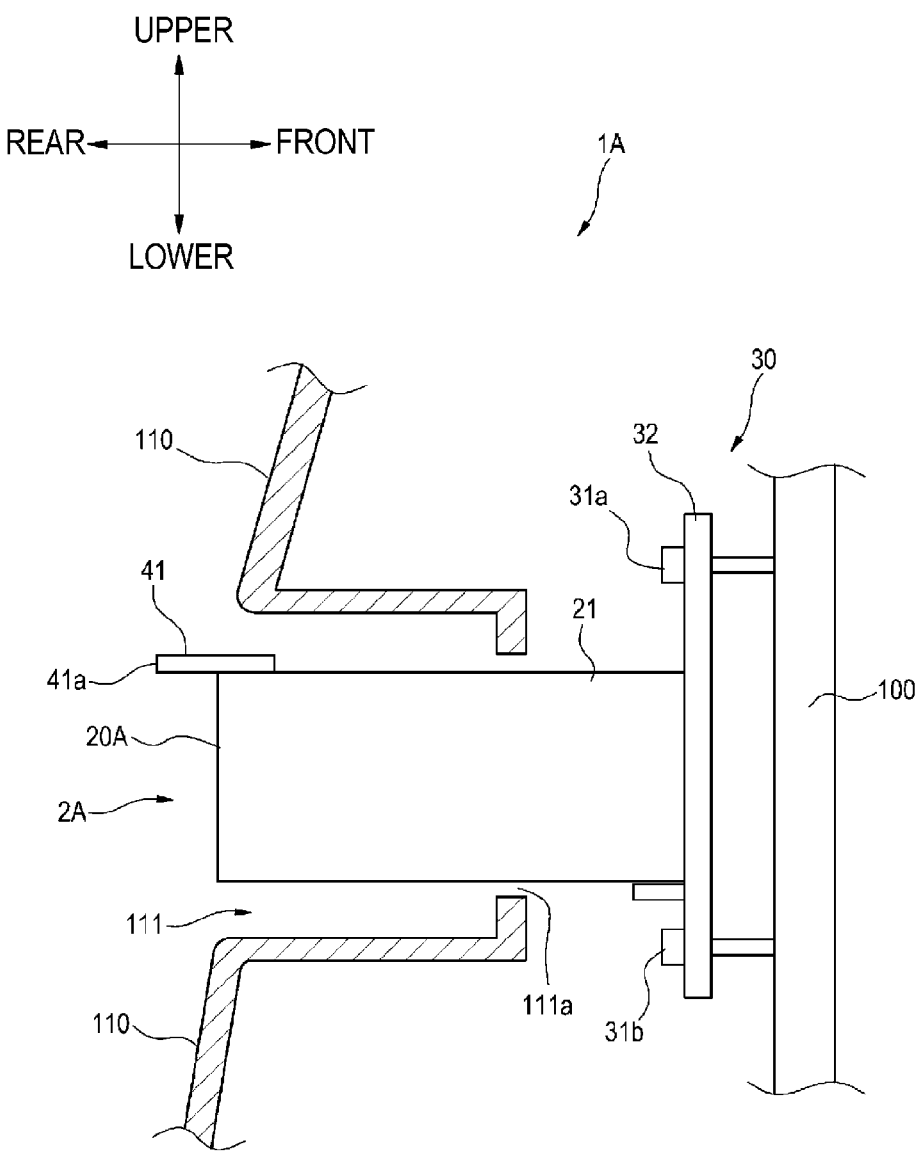
FIG. 6 is a view illustrating a protrusion provided in an in-vehicle sensor.

FIG. 6 is a view illustrating the configuration of a vehicular system 1A according to a second modification.

As illustrated in FIG. 6, in the vehicular system 1A of the second modification, the protrusion 41 is provided in the casing portion 21 of the LiDAR 2A. The protrusion 41 is provided so as to extend rearward of the vehicle V at the rear end portion of the upper edge of the casing portion 21. In this example, the protrusion 41 provided in the casing portion 21 is a member of the immediate upper portion of the light receiving/emitting surface 20A of the LiDAR 2A. The protrusion 41 is detachably provided to the rear bumper 21. The shape of the protrusion 41 may be the same as the shape of the protrusion illustrated in FIG. 4 or FIG. 5.

The light receiving/emitting surface 20A of the LiDAR 2A is arranged at the inner side of the vehicle than a rear end 4a of the protrusion 41 of the immediate upper portion (forward direction with respect to the vehicle V).

Further, the same reference numerals are given to the same components as those of the vehicular system 1 illustrated in FIG. 3, and description thereof will be omitted.

According to such a configuration, the protrusion 41 provided in the LiDAR 2A is a member provided right above the light receiving/emitting surface 20A of the LiDAR 2A, and the protrusion 41 is provide to be arranged at the outer side of the vehicle (rearward direction with respect to the vehicle V). Therefore, as in the case of the protrusion 4 provided in the rear bumper 110, it is possible to suppress the adhesion of dirt to the light receiving/emitting surface 20A.

Figure 7:
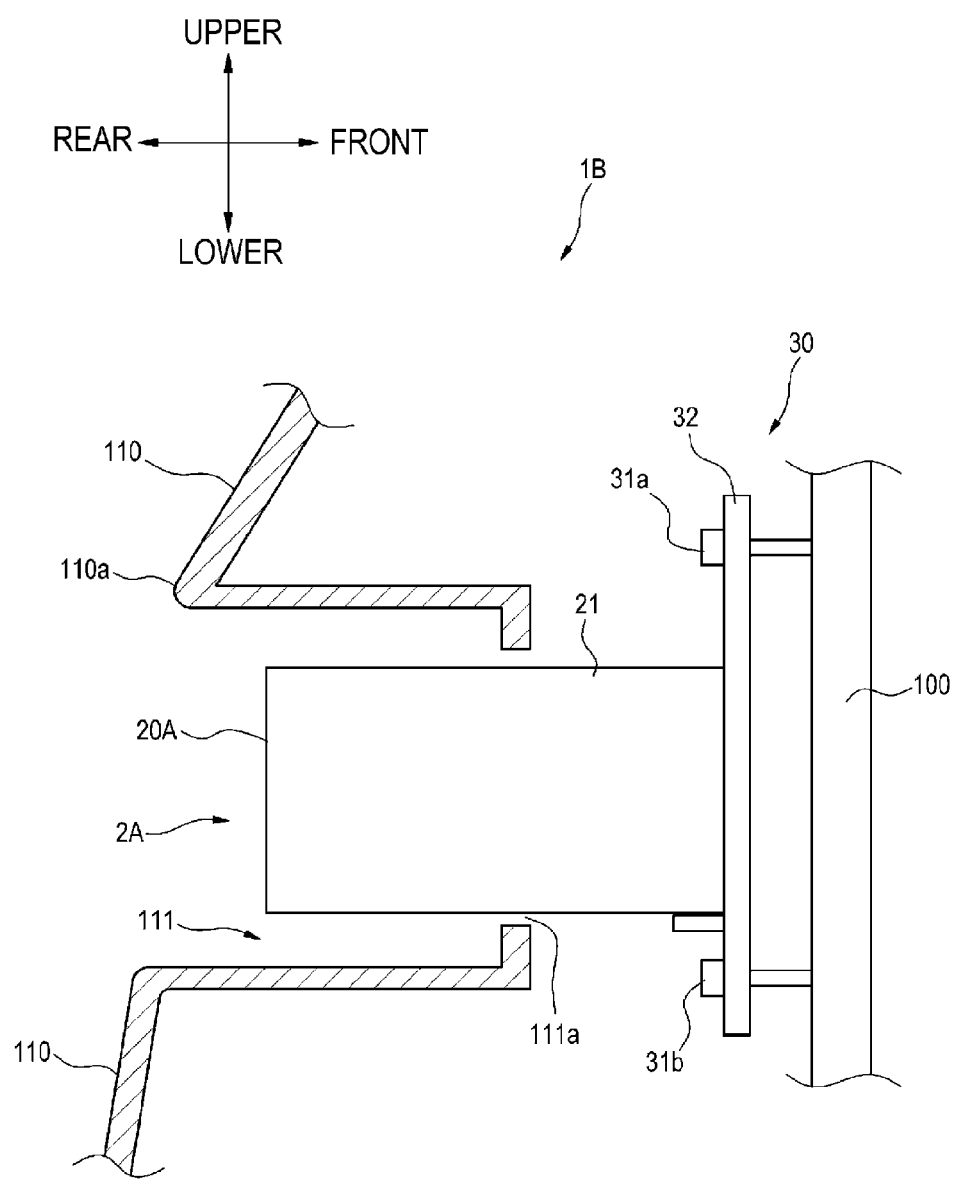
FIG. 7 is a view illustrating an example in which no protrusion is provided.

FIG. 7 is a view illustrating the configuration of a vehicular system 1B according to a third modification.

As illustrated in FIG. 7, in the vehicular system 1B according to the third modification, the rear bumper 110 arranged at the upper side of the LiDAR 2A is a member of the immediate upper portion of the light receiving/emitting surface 20A of the LiDAR 2A. The light receiving/emitting surface 20A of the LiDAR 2A is arranged at the inner side of the vehicle than a rear end 110a of the rear bumper 110 of the immediate upper portion (forward direction with respect to the vehicle V).

Further, the same reference numerals are given to the same components as those of the vehicular system 1 illustrated in FIG. 3, and description thereof will be omitted.

According to such a configuration, the rear bumper 110 provided right above the LiDAR 2A may suppress adhesion of dirt to the light receiving/emitting surface 20A in the same manner as the above-described protrusion 4.

Figure 8:
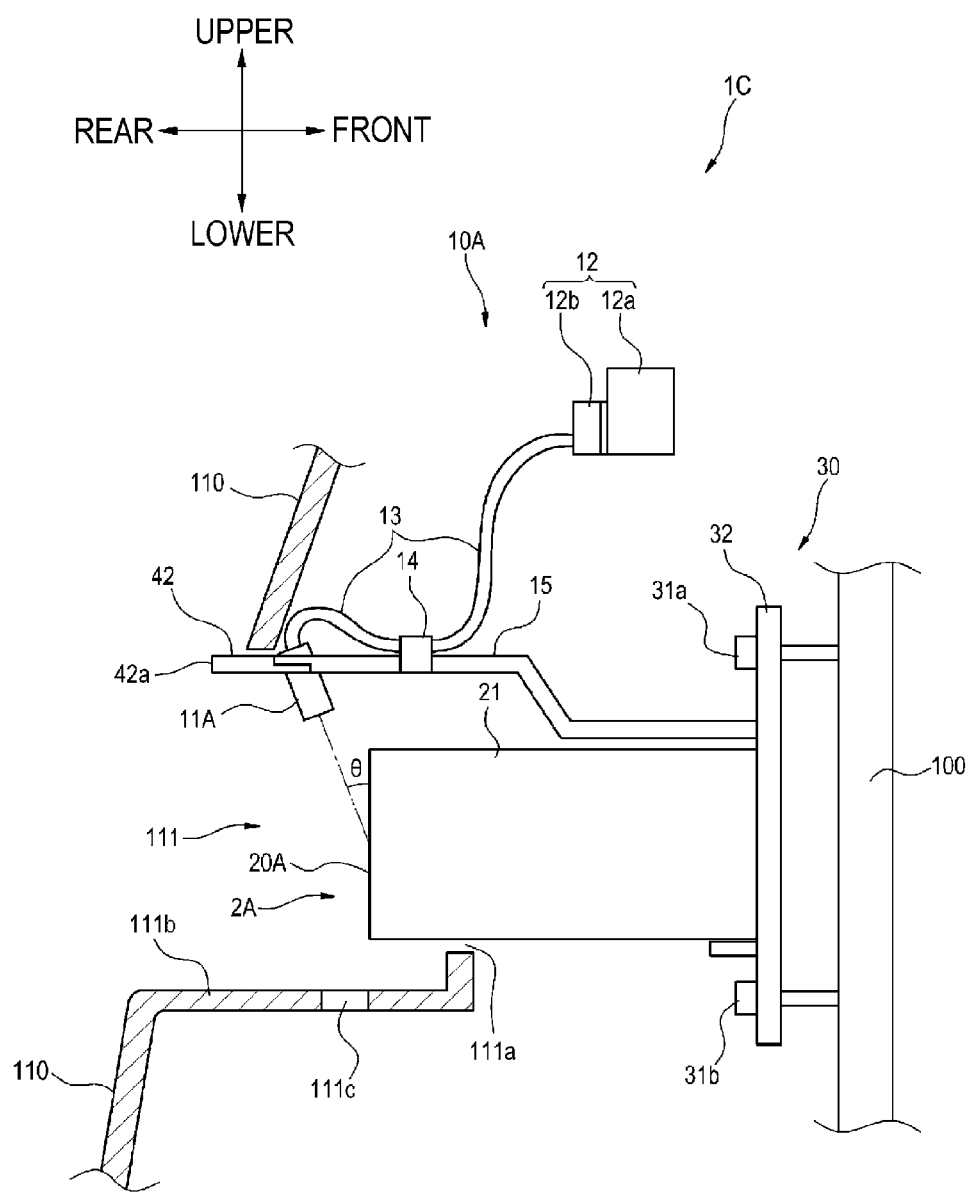
FIG. 8 is a view illustrating a protrusion provided in a cleaner.

FIG. 8 is a diagram illustrating a configuration of a vehicular system 1C according to a fourth modification.

As illustrated in FIG. 8, in the vehicular system 1A of the fourth modification, the LiDAR cleaner 10A is provided in the upper portion 21 of the LiDAR 2A. The LiDAR cleaner 10A includes a nozzle 11A that sprays a cleaning medium, a tank 12a and a pump 12b that supply the cleaning medium, a hose 13 that connects the nozzle 11A and the pump 12b, and a support part 15 that supports the nozzle 11A.

The nozzle 11A is provided in the support part 15 and disposed diagonally in front of and above the LiDAR 2A. The support part 15 is provided in the aiming plate 32 of the aiming mechanism 30. When the LiDAR cleaner 10A is in operation, that is, in a state where the light receiving/emitting surface 20A of the LiDAR 2A is being cleaned, the nozzle 11A is disposed at a position protruding to the outer side of the vehicle than the light receiving/emitting surface 20A (rearward direction with respect to the vehicle V). Further, the direction of the nozzle 11A is adjusted so that the cleaning medium sprayed from the nozzle 11A is incident at an acute angle θ (e.g., θ=5° to 30°) with respect to the light receiving/emitting surface 20A. The hose 13 is provided in the support part 15 by a restraining part 14 such as a band or a clip. A lower wall 111b of the recess 111 of the rear bumper 110 is provided with a discharge hole 111c that releases the cleaning medium after cleaning the light receiving/emitting surface 20A.

The protrusion 42 of the fourth modification is provided on the support part 15 of the LiDAR cleaner 10A. The protrusion 42 is provided so as to extend rearward of the vehicle V at the rear end portion of the support part 15. In this example, the protrusion 42 provided in the support part 15 is a member of the immediate upper portion of the light receiving/emitting surface 20A of the LiDAR 2A. The protrusion 42 is detachably provided to the support part 15. The shape of the protrusion 42 may be the same as the shape of the protrusion illustrated in FIG. 4 or FIG. 5.

The light receiving/emitting surface 20A of the LiDAR 2A is disposed on the inner side of the vehicle than the rear end 42a of the protrusion 42 of the immediate upper portion (forward direction with respect to the vehicle V).

Further, the same reference numerals are given to the same components as those of the vehicular system 1 illustrated in FIG. 3, and description thereof will be omitted.

According to such a configuration, while the protrusion 42 provided in the LiDAR cleaner 10A that cleans the LiDAR 2A prevents adhesion of dirt to the LiDAR 2A, when the dirt adheres, the LiDAR 2A may be cleaned by the LiDAR cleaner 10A.

In addition, although not illustrated, the camera 2B of the vehicular system 1 may have the same configuration as the above-described LiDAR 2A. That is, the camera 2B is provided in a recess formed in the vehicle body panel 120 of the back door, and may have a configuration in which the lens 20B of the camera 2B is disposed in the inner side of the vehicle than the immediate upper portion in the same manner as the LiDAR 2A.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular system comprising:
a first in-vehicle sensor having a first cleaning target surface, the first in-vehicle sensor being provided on a first portion of a design part forming an appearance of a vehicle, the first portion of the design part including a rear bumper of the vehicle, and the first in-vehicle sensor being arranged so as to face an exterior of the vehicle, wherein the first in-vehicle sensor is contained in a casing portion; and
a second in-vehicle sensor provided on a second portion of the design part above the first portion of the design part, the second in-vehicle sensor having a second cleaning target surface arranged so as to face the exterior of the vehicle,
wherein the first in-vehicle sensor is disposed in a recess provided in the rear bumper of the vehicle so that the first cleaning target surface is arranged at a position closer to an inner side of the vehicle than an immediate upper portion of the rear bumper provided above the first cleaning target surface,
wherein the immediate upper portion is constituted by a protrusion provided on the rear bumper,
wherein the protrusion comprises a planar plate oriented in a substantially perpendicular direction with the first cleaning target surface, and at least one side plate extending downward along at least one side surface of the first cleaning target surface,
wherein the at least one side plate has a width substantially uniform along the at least one side surface of the first cleaning target surface, and
wherein the casing portion containing the first in-vehicle sensor is coupled to a vehicle frame and is physically spaced apart from the rear bumper of the vehicle.

2. The vehicular system of claim 1, wherein the protrusion is detachably provided with respect to the rear bumper or the first in-vehicle sensor.

3. The vehicular system of claim 1, further comprising:
a first cleaner having a nozzle that sprays a cleaning medium on the first cleaning target surface.

4. The vehicular system of claim 1, wherein the protrusion extends along an upper edge of the first cleaning target surface and has a width in a left-and-right direction which is larger than a width in a left-and-right direction of the first cleaning target surface.

5. The vehicular system of claim 2, wherein the protrusion extends along an upper edge of the first cleaning target surface and has a width in a left-and-right direction which is larger than a width in a left-and-right direction of the first cleaning target surface.

6. The vehicular system of claim 3, wherein the protrusion extends along an upper edge of the first cleaning target surface and has a width in a left-and-right direction which is larger than a width in a left-and-right direction of the first cleaning target surface.

7. The vehicular system of claim 4, wherein the protrusion further comprises two side plates, including the at least one side plate, each extending along both side surfaces of the first cleaning target surface.

8. The vehicular system of claim 5, wherein the protrusion further comprises two side plates, including the at least one side plate, each extending along both side surfaces of the first cleaning target surface.

9. The vehicular system of claim 6, wherein the protrusion further comprises two side plates, including the at least one side plate, each extending along both side surfaces of the first cleaning target surface.

10. The vehicular system of claim 1, further comprising:
a second cleaner having a nozzle that sprays a cleaning medium on the second cleaning target surface.

11. The vehicular system of claim 1, wherein:
the protrusion further comprises two side plates, including the at least one side plate, each extending along both side surfaces of the first cleaning target surface.

12. The vehicular system of claim 11, wherein:
the protrusion is not in direct contact with the first in-vehicle sensor.

13. The vehicular system of claim 11, wherein the first in-vehicle sensor is mounted on an aiming plate so that the first in-vehicle sensor is capable of being movable according to a motion of the aiming plate, wherein the recess is formed by outer surfaces of the rear bumper of the vehicle, and the protrusion is attached on an upper surface of the recess.

14. The vehicular system of claim 1, wherein the protrusion comprises an upper surface and a lower surface, and the lower surface of the protrusion is physically spaced apart from the first in-vehicle sensor.

15. The vehicular system of claim 1, further comprising first and second vertical plates, wherein the first and second vertical plates are attached to both sides of the protrusion so that the first and second vertical plates and the protrusion collectively surround the first in-vehicle sensor.

\* \* \* \* \*